March 5, 1963
A. GOLDHAMMER
3,079,850
PHOTOGRAPHIC CAMERA WITH EXPOSURE COUNTING
DEVICE AND REWINDING ATTACHMENT
Filed Dec. 8, 1958
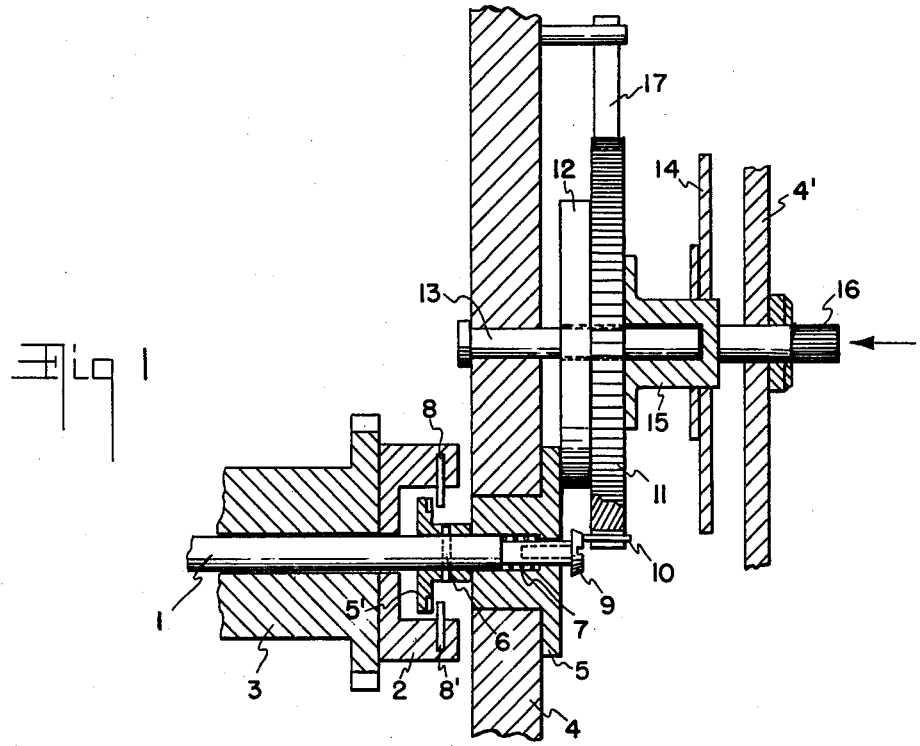
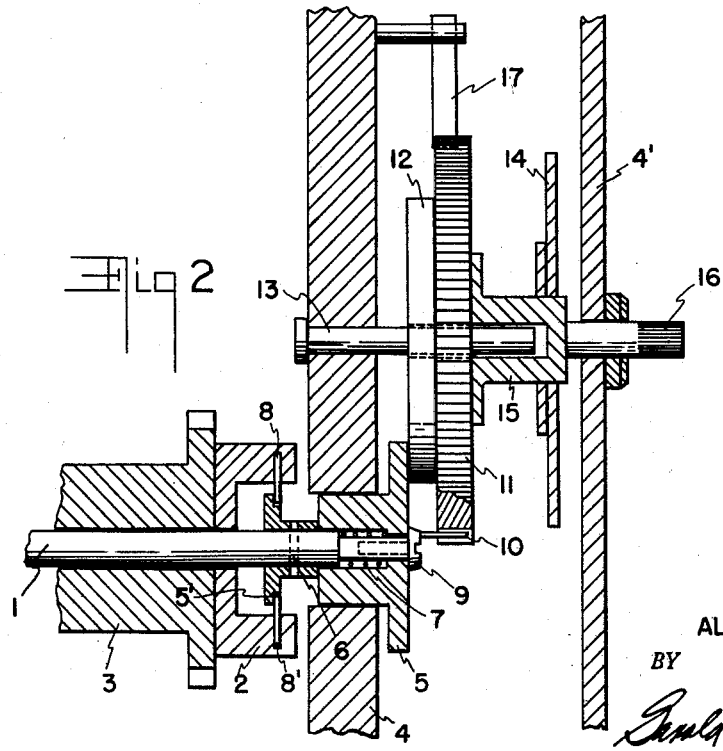
INVENTOR.
ALBERT GOLDHAMMER
BY

United States Patent Office 3,079,850
Patented Mar. 5, 1963

3,079,850
PHOTOGRAPHIC CAMERA WITH EXPOSURE COUNTING DEVICE AND REWINDING ATTACHMENT
Albert Goldhammer, Nussdorf, Baden, Germany, assignor to Bodenseewerk Perkin-Elmer & Co., G.m.b.H., Uberlingen (Bodensee), Germany
Filed Dec. 8, 1958, Ser. No. 779,023
Claims priority, application Germany Dec. 7, 1957
3 Claims. (Cl. 95—31)

This invention is concerned with a photographic camera incorporating an exposure counting device that is driven by the film-feed roll and which can be set by means of a setting knob arranged at the outside of the camera. The counting device can be set to zero after the camera has been loaded with a new film.

It is well known with photographic cameras to disengage the film-feed roll from its driving shaft, so that the exposed film can be rewound into a cartridge or film holder that is impermeable to light. A special operating member that may have the form of a lever or the like and which is set to the position "rewinding" is usually provided on conventional type cameras for the disengaging of the film-feed roll which is necessary to permit the rewinding operation.

It is the object of the invention to provide an improved camera in which the counting device operates in conjunction with the rewinding attachment. The counting wheel of the exposure counting device is movable in an axial direction by means of a setting knob which can be operated from the outside of the camera, and a rewinding clutch arranged inside the film-feed roll is actuated by the axial movement. An additional operating member which is otherwise necessary for the rewinding clutch is thereby eliminated. Moreover, a very simple structure for the drive of the counting mechanism results if an eccentric tripping pin is arranged on the front face of the driving shaft to be engaged or disengaged with the film-feed roll. The eccentric tripping pin engages the counting wheel each time the driving shaft is rotated, so that the counting wheel is advanced one tooth pitch by each revolution of the driving shaft.

A preferred embodiment of the invention is illustrated schematically in the accompanying drawings and more fully described in the following detailed description.

FIG. 1 is a cross-sectional elevational view of an embodiment of the apparatus of the invention shown at one extreme of its operating position; and FIG. 2 is a view similar to FIG. 1 but illustrating the apparatus at the other extreme of movement.

In the embodiment of FIG. 1, numeral 1 designates a driving shaft on which is loosely fitted a film-feed roll (or take-up spool) 3, which is connected with a guide collar 2. A clutch element 5 is positioned in the wall of the housing 4. The head 5' of the clutch element 5 is slotted and is guided in an axial direction on a transverse pin 6 of the driving shaft 7. A spring 7, which is arranged inside the clutch element 5, has the tendency of forcing the clutch element towards the outside causing the slotted head 5' to engage the clutch pins 8, 8', as shown in FIG. 2, which latter pins are mounted radially on the guide collar 2. A screw 9 with an eccentric tripping pin 10 is arranged in the front end of the driving shaft 1. Upon each revolution of the driving shaft 1, the tripping pin 10 engages the counting wheel 11 and rotates the latter wheel by one tooth pitch. The counting wheel 11, which rests with a collar 12 on the clutch element 5, is guided axially on a bearing pin 13 and is connected with a counting disk 14 through a flanged part 15. The flanged part 15 is provided with a milled setting knob 16 which projects through the wall of the housing 4'. Numeral 17 designates a detent spring that engages the teeth of the counting wheel 11.

The mechanism described is illustrated in FIG. 1 in a position where the setting knob 16 has been pressed in the direction of the arrow and consequently the counting wheel 11 has been moved axially towards the left. This axial movement of the counting wheel has also caused the collar 12 to move the clutch element 5 axially against the action of the spring 7 whereby the slotted head 5' has been disengaged from the clutch pins 8, 8'. The film-feed roll 3 can now freely rotate on the driving shaft 1, so that the film may be rewound. When releasing the setting knob 16, as shown in FIG. 2, the spring 7 moves the clutch element 5 again to the right thereby establishing the coupling (5'/8, 8') between the driving shaft 1 and the film-feed roll. At the same time, the clutch element 5 also moves the counting wheel 11 axially towards the outside. The eccentric tripping pin 10 engages the counting wheel 11 and advances it upon each revolution of the driving shaft 1. When the tripping pin 10 is disengaged, the counting wheel 11 and the counting disk 14 can be rotated against the action of the detent spring 17 and may be set to zero position by operating the setting knob 16. In actual operation, a fresh roll of film on a supply spool is inserted in the camera in the usual manner. The free end of the film is secured to the take-up spool (or film-feed roll) 3 and the case is closed. The film is then advanced onto roll 3 by means of a manual feed knob (not shown) positioned to drive the opposite end of shaft 1. During these operations, the mechanism of the invention is as shown in FIG. 2. When the first frame has been moved into position, the feed knob is adjusted to free pin 10 from the teeth of counting wheel 11. The knob 16 is then rotated until the proper digit printed on the outer face of disc 14 is seen through a suitable aperture (not shown) in the outer camera housing 4'.

As the film is used and wound onto roll 3, counting disc 14 advances one tooth pitch of wheel 11 with each rotation of roll 3.

When the film is completely exposed and it is desired to rewind it onto the supply spool, knob 16 is depressed, as shown in FIG. 1. This disengages clutch head 5' from roll 3, as described above. Roll 3 is then free to rotate on shaft 1 and the film is rewound onto the supply spool.

I claim:

1. A photographic camera having a film rewinding arrangement, and an exposure counting device which is driven by the film take-up spool, and which comprises a counting wheel on said exposure counting device which is axially movable, a setting knob operable from outside said camera to effect such axial movement of said counting wheel, and a counting wheel clutch normally connected to said film take-up spool and disconnectable therefrom by the axial movement of said counting wheel when the film is to be rewound.

2. A photographic camera comprising an exposure counting device driven by the film take-up spool, drive shaft means adapted to actuate said take-up spool, a counting wheel on said exposure counting device which is axially movable, a setting knob operable from outside the camera to effect such axial movement of said counting wheel, a clutch between said driving shaft and take-up spool adapted to be actuated by the axial movement of said counting wheel, an eccentric pin on said driving shaft engaging said counting wheel upon each revolution of said driving shaft whereby said counting wheel is advanced by one tooth pitch for each rotation of said driving shaft.

3. Photographic camera means comprising a camera body having an interior wall member therein; drive shaft means in substantially perpendicular relationship to said interior wall member and extending therethrough; pin means eccentrically affixed to the end of said drive shaft means and extending parallel to the longitudinal axis thereof; drive shaft support means slidably retained in said interior wall member and having therein a hole rotatably supporting said drive shaft means; shoulder means on one end of said drive shaft supporting means supported by said interior wall member to limit the inward axial movement of said drive shaft supporting means relative to said wall member; substantially cylindrical film roll means supported by said drive shaft means in rotatable relationship therewith; coupling means on the other end of said drive shaft supporting means positioned to drivably engage said film roll means at one extreme of the axial movement of said drive shaft supporting means relative to said drive shaft means and said interior wall member; second shaft means supported at one end by said interior wall member and having its longitudinal axis substantially parallel to the longitudinal axis of said drive shaft means; spur gear means supported by said second shaft means, rotatable thereon, and meshing with said pin means; means intermediate said gear means and said drive shaft supporting means to transmit axial motion therebetween; counting means in driven relationship to said gear means; manual setting shaft means extending through the outer wall of said camera body, longitudinally slidable therein, and in depressable relationship with all of said gear means, drive shaft supporting means, and coupling means to uncouple said drive shaft means from said film roll means upon manual depression thereof; and resilient means yieldably opposing the uncoupling motion.

References Cited in the file of this patent
UNITED STATES PATENTS

| | | |
|---|---|---|
| 2,289,827 | Crumrine | July 14, 1942 |
| 2,563,811 | Barnes | Aug. 14, 1951 |
| 2,791,163 | Bammesberger et al. | May 7, 1957 |
| 2,924,158 | Kopp et al. | Feb. 9, 1960 |